US007880833B2

(12) United States Patent
Shin et al.

(10) Patent No.: US 7,880,833 B2
(45) Date of Patent: Feb. 1, 2011

(54) THIN FILM TRANSISTOR ARRAY PANEL FOR A DISPLAY

(75) Inventors: Kyoung-Ju Shin, Hwaseong-si (KR); Hye-Young Ryu, Seoul (KR); Jang-Soo Kim, Yongin-si (KR); Chong-Chul Chal, Seoul (KR); Jae-Hyoung Youn, Seoul (KR); Young-Wook Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 542 days.

(21) Appl. No.: 11/930,653

(22) Filed: Oct. 31, 2007

(65) Prior Publication Data

US 2008/0252828 A1 Oct. 16, 2008

(30) Foreign Application Priority Data

Apr. 12, 2007 (KR) .................... 10-2007-0036081

(51) Int. Cl.
*G02F 1/1335* (2006.01)
*G02F 1/1343* (2006.01)

(52) U.S. Cl. .................. 349/106; 349/144; 349/146
(58) Field of Classification Search .................. None
See application file for complete search history.

(56) References Cited

U.S. PATENT DOCUMENTS

2007/0139597 A1* 6/2007 Shim et al. ................. 349/139
2007/0194320 A1* 8/2007 Cho et al. ................... 257/72
2008/0129669 A1* 6/2008 Kim ............................ 345/88

* cited by examiner

Primary Examiner—Michelle R Connelly Cushwa
(74) Attorney, Agent, or Firm—F. Chau & Associates, LLC

(57) ABSTRACT

A thin film transistor array panel includes a substrate, a first gate line and a second gate line formed on the substrate, a storage electrode line between the first gate line and the second gate line, a data line intersecting the first gate line and the second gate line, a first thin film transistor connected to the first gate line and the data line, at least one color filter formed on the first thin film transistor, wherein the color filter comprises a first portion adjacent the first gate line with respect to the storage electrode line, a second portion adjacent the second gate line with respect to the storage electrode line, and a first connection connecting the first portion and the second portion and having a narrower width than that of the first and second portions, a first sub-pixel electrode formed on the color filter and connected to the first thin film transistor, and a second sub-pixel electrode facing the first sub-pixel electrode with respect to a gap, wherein at least one of an edge of the first sub-pixel electrode and an edge of the second sub-pixel electrode crosses over the first connection of the color filter, the edge of the first sub-pixel electrode, and the edge of the second sub-pixel electrode defining the gap between the first sub-pixel electrode and the second sub-pixel electrode.

28 Claims, 14 Drawing Sheets

ND TRANSISTOR ARRAY PANEL
THIN FILM TRANSISTOR ARRAY PANEL FOR A DISPLAY

CROSS-REFERENCE TO RELATED APPLICATION

This application claims priority to Korean Patent Application No. 10-2007-0036081 filed on Apr. 12, 2007, the entire contents of which are incorporated herein by reference.

BACKGROUND OF THE INVENTION (a) Technical Field

The present disclosure relates to a liquid crystal display, and more particularly to a liquid crystal display including thin film transistors having color filters.

(b) Discussion of the Related Art

Liquid crystal displays (LCDs) include a pair of panels including electric field generating electrodes such as a plurality of pixel electrodes and a common electrode. A liquid crystal (LC) layer can be interposed between the pair of panels. The LC layer has dielectric anisotropy. In the LCD, voltages are applied to the pixel and common electrodes to generate an electric field at the LC layer. The strength of the electric field can be changed to control transmittance of light passing through the liquid crystal layer, thus obtaining desired images.

The LCD includes a plurality of pixels arranged in a matrix and a plurality of signal lines transmitting signals to the pixels. Each of the pixels includes the field generating electrode and a thin film transistor (TFT). The signal lines include, for example, gate lines transmitting a gate signal and data lines transmitting data voltages. Each of the pixels includes color filters representing colors, the field generating electrodes and the TFT.

The gate lines, the data lines, the pixel electrodes, and the TFTs can be disposed on a first panel. The common electrode and the color filters can be disposed on a second panel. For increasing aperture ratio of the panels, the color filters and the TFTs can be disposed on the same panel.

However, height differences may be present between portions with the color filters and without the color filters. Thus, when the TFTs and the color filters are formed on the same panel, etching of the pixel electrodes formed on the color filters can be difficult due to the height differences.

SUMMARY OF THE INVENTION

According to an embodiment of the present invention, a thin film transistor array panel includes a substrate, a first gate line and a second gate line that are formed on the substrate, a storage electrode line between the first gate line and the second gate line, a data line intersecting the first gate line and the second gate line, a first thin film transistor connected to the first gate line and the data line, at least one color filter formed on the first thin film transistor, wherein the color filter includes a first portion adjacent the first gate line with respect to the storage electrode line, a second portion adjacent the second gate line with respect to the storage electrode line, and a first connection connecting the first portion and the second portion and having a narrower width than that of the first and second portions, a first sub-pixel electrode formed on the color filter and connected to the first thin film transistor, and a second sub-pixel electrode facing the first sub-pixel electrode with respect to a gap. At least one of an edge of the first sub-pixel electrode and an edge of the second sub-pixel electrode may cross over the first connection of the color filter, the edge of the first sub-pixel electrode and the edge of the second sub-pixel electrode defining the gap between the first sub-pixel electrode and the second sub-pixel electrode.

The edge of the first sub-pixel electrode and the edge of the second sub-pixel electrode may cross over the first connection of the color filter.

The entire edge of the first sub-pixel electrode and the entire edge of the second sub-pixel electrode may cross over the first connection of the color filter.

The thin film transistor array panel may further include a second connection connecting the first portion and the second portion of the color filter and having a narrower widthe than that of the first and second portions, and at least one of an edge of the first sub-pixel electrode and an edge of the second sub-pixel electrode adjacent the data line may cross over the second connection of the color filter.

The edge adjacent the data line of the edges of the first sub-pixel electrode and the second sub-pixel electrode may cross over the first connection of the color filter.

The second connection may be formed at portions of a pixel area neighboring over the data line.

The thin film transistor array panel may further include a shielding electrode formed on the color filter and formed along the data line, and two edges of the shielding electrode that are parallel to the data line may cross over the second connection.

The thin film transistor array panel may further include a shielding electrode formed on the color filter and formed along the data line, and two color filters that are respectively formed on left and right portions with respect to the data line partly overlap, and two edges of the shielding electrode that are parallel to the data line may be disposed portions outside the overlapping portions of the color filter.

The thin film transistor array panel may further include a second connection connecting the first portion and the second portion of the color filter and having a narrower width than that of the first and second portions, and two edges of the shielding electrode that are parallel to the data line may cross over the second connection of the color filter.

The second connection may include two edges parallel to the data line, and two edges of the shielding electrode that are parallel to the data line are positioned between two edges of the second connection.

The thin film transistor array panel may further include a second thin film transistor connected to the second gate line, the data line, and the second pixel electrode.

The first sub-pixel electrode and the second sub-pixel electrode may be curved.

The thin film transistor array panel may further include a second connection connecting the first portion and the second portion of the color filter and having a narrower width than that of the first and second portions, at least one of an edge of the first sub-pixel electrode and an edge of the second sub-pixel electrode that are adjacent the data line cross over the second connection of the color filter, and the second connection may be curved along an edge of the first sub-pixel electrode or the second sub-pixel electrode.

The first connection may overlap the storage electrode line.

The second connection may overlap the storage electrode line.

According to an embodiment of the present invention, a thin film transistor array panel includes a substrate, a gate line formed on the substrate, a storage electrode line parallel to the gate line, a first data line and a second data line that intersect the gate line and storage electrode line, a thin film transistor connected to the gate line and the first data line, at least one color filter formed on the thin film transistor, the color filter including a first portion and a second portion that are opposite with respect to the storage electrode line, and a first connection connecting the first portion and the second portion and having a narrower width than that of the first and second portions, and a pixel electrode formed on the color filter, connected to the thin film transistor, and disposed between the first data line and the second data line. At least one of an edge of the pixel electrode adjacent to the first data line and an edge of the pixel electrode adjacent the second data line crosses over the first connection of the color filter.

The edge of the pixel electrode adjacent the first data line and the edge of the pixel electrode adjacent the second data line may cross over the first connection of the color filter.

The first connection may overlap the storage electrode line.

The thin film transistor array panel may further include a shielding electrode formed on the color filter and formed along the first data line, and two edges of the shielding electrode that are parallel to the first data line cross over the first connection.

The thin film transistor array panel may further include a shielding electrode formed on the color filter and formed along the first data line, and two color filters that are respectively formed on both portions with respect to the first data line partly overlap, and two edges of the shielding electrode that are parallel to the first data line may be disposed at portions out of the overlapping portions of the color filter The first connection may include two edges parallel to the data line, and two edges of the shielding electrode that are parallel to the first data line may be positioned between two edges of the first connection.

According to an embodiment, a thin film transistor array panel includes a substrate a gate line formed on the substrate, a storage electrode line formed on the substrate and parallel to the gate line, a data line intersecting the gate line and storage electrode line, a thin film transistor connected to the gate line and the first data line, a color filter formed on the thin film transistor, and a pixel electrode formed on the color filter and connected to the thin film transistor, the pixel electrode being curved at at least one portion to have a convex portion and a concave portion. The color filter is curved along the pixel electrode and comprises a protrusion overlapping a sharp end of the convex portion of the pixel electrode.

The color filter may further include a protrusion adjacent to a base of the concave portion of the pixel electrode.

The protrusion adjacent to the base of the concave portion of the pixel electrode may be connected to a protrusion of the color filter overlapping a sharp end of a convex portion of a neighboring pixel electrode.

The protrusion overlapping the sharp end and the protrusion adjacent the base may overlap the storage electrode line.

BRIEF DESCRIPTION OF THE DRAWINGS

Exemplary embodiments of the present invention can be understood in more detail from the following descriptions taken in conjunction with the accompanying drawings, in which.

DETAILED DESCRIPTION OF EXEMPLARY EMBODIMENTS

Exemplary embodiments of the present invention will be described below in more detail with reference to the accompanying drawings. The present invention may, however, be embodied in many different forms and should not be construed as limited to the exemplary embodiments set forth herein.

It will be understood that when an element such as a layer, film, region, substrate, or panel is referred to as being "on" another element, it can be directly on the other element or intervening elements may also be present.

Figure 1:
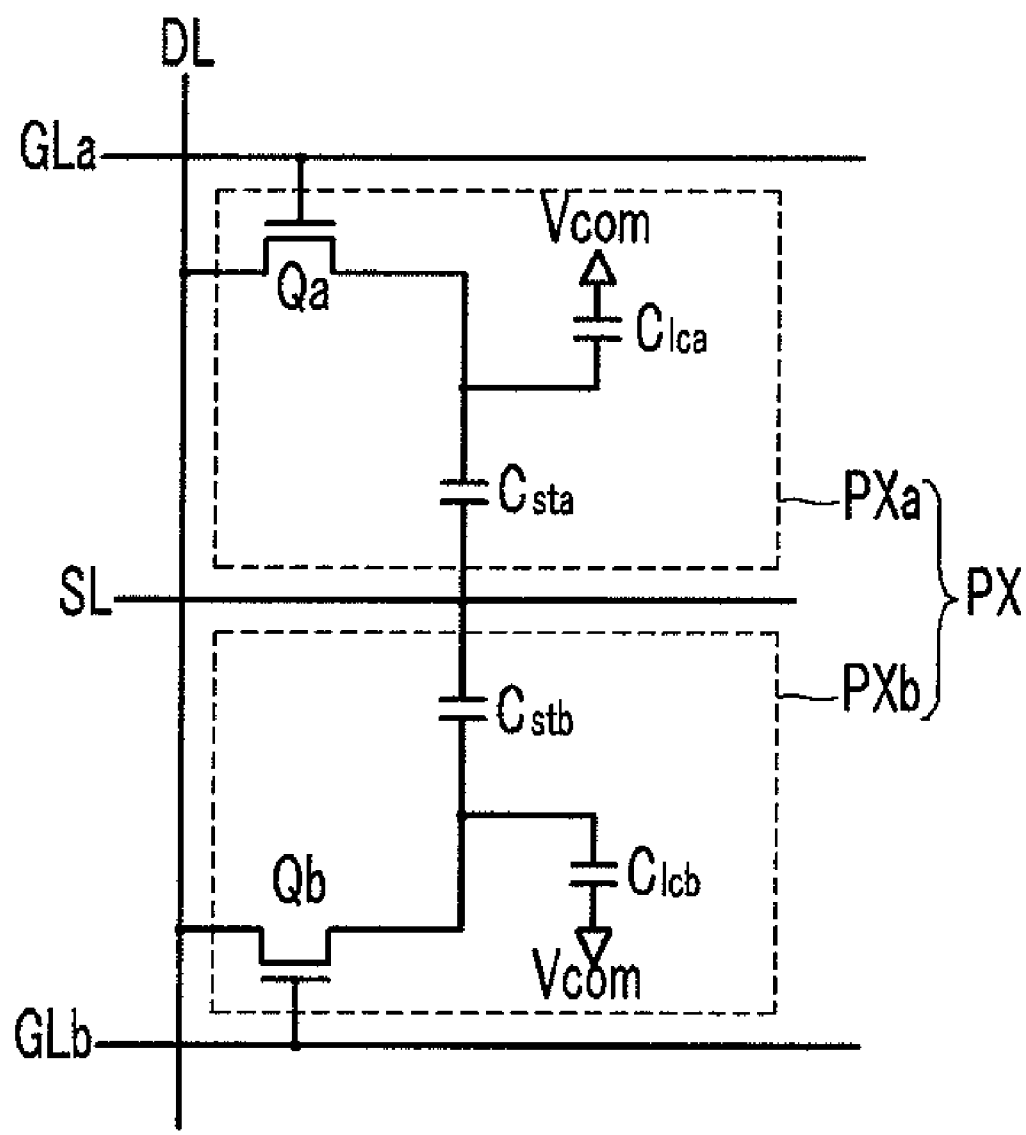
FIG. 1 is a circuit diagram of signal lines and a pixel according to an exemplary embodiment of the present invention.

FIG. 1 is a circuit diagram of signal lines and a pixel according to an exemplary embodiment of the present invention.

The LC panel assembly shown in FIG. 1 includes a plurality of signal lines and a plurality of pixels PX connected thereto. The signal lines include a plurality of pairs of gate lines GLa and GLb, a plurality of data lines DL, and a plurality of storage electrode lines SL extending substantially parallel to the gate lines GLa and GLb.

Each pixel PX includes a pair of subpixels PXa and PXb. Each subpixel PXa/PXb includes a switching element Qa/Qb connected to one of the gate lines GLa and GLb and one of the data lines DL, an LC capacitor Clca/Clcb coupled to the switching element Qa/Qb, and a storage capacitor Csta/Cstb connected between the switching element Qa/Qb and the storage electrode line SL.

The switching element Qa/Qb such as a thin film transistor (TFT) is disposed on a lower panel 100 and has three terminals, i.e., a control terminal connected to a gate line GLa/GLb, an input terminal connected to a data line DL, and an output terminal connected to the LC capacitor Clca/Clcb and the storage capacitor Csta/Cstb.

The storage capacitor Csta/Cstb is an auxiliary capacitor for the LC capacitor Clca/Clcb. The storage capacitor Csta/Cstb includes a subpixel electrode and a separate signal line, which is provided on the lower panel 100. The separate signal line overlaps the subpixel electrode via an insulator, and is supplied with a predetermined voltage such as the common voltage Vcom. Alternatively, the storage capacitor Csta/Cstb includes the subpixel electrode and an adjacent gate line referred to as a previous gate line, which overlaps the subpixel electrode via an insulator.

Figure 2:
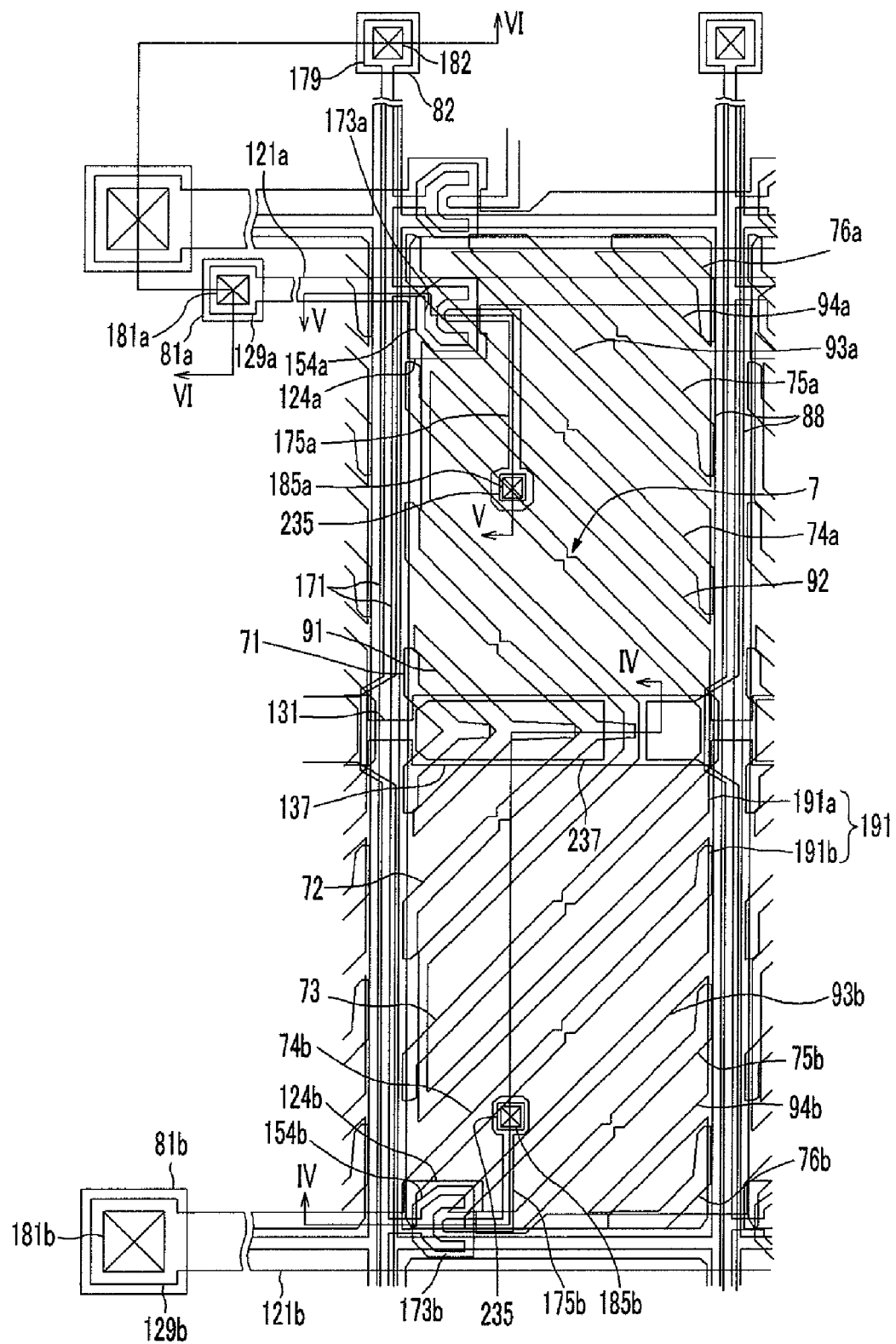
FIG. 2 is a layout view of an LCD according to an exemplary embodiment of the present invention.
Figure 3:
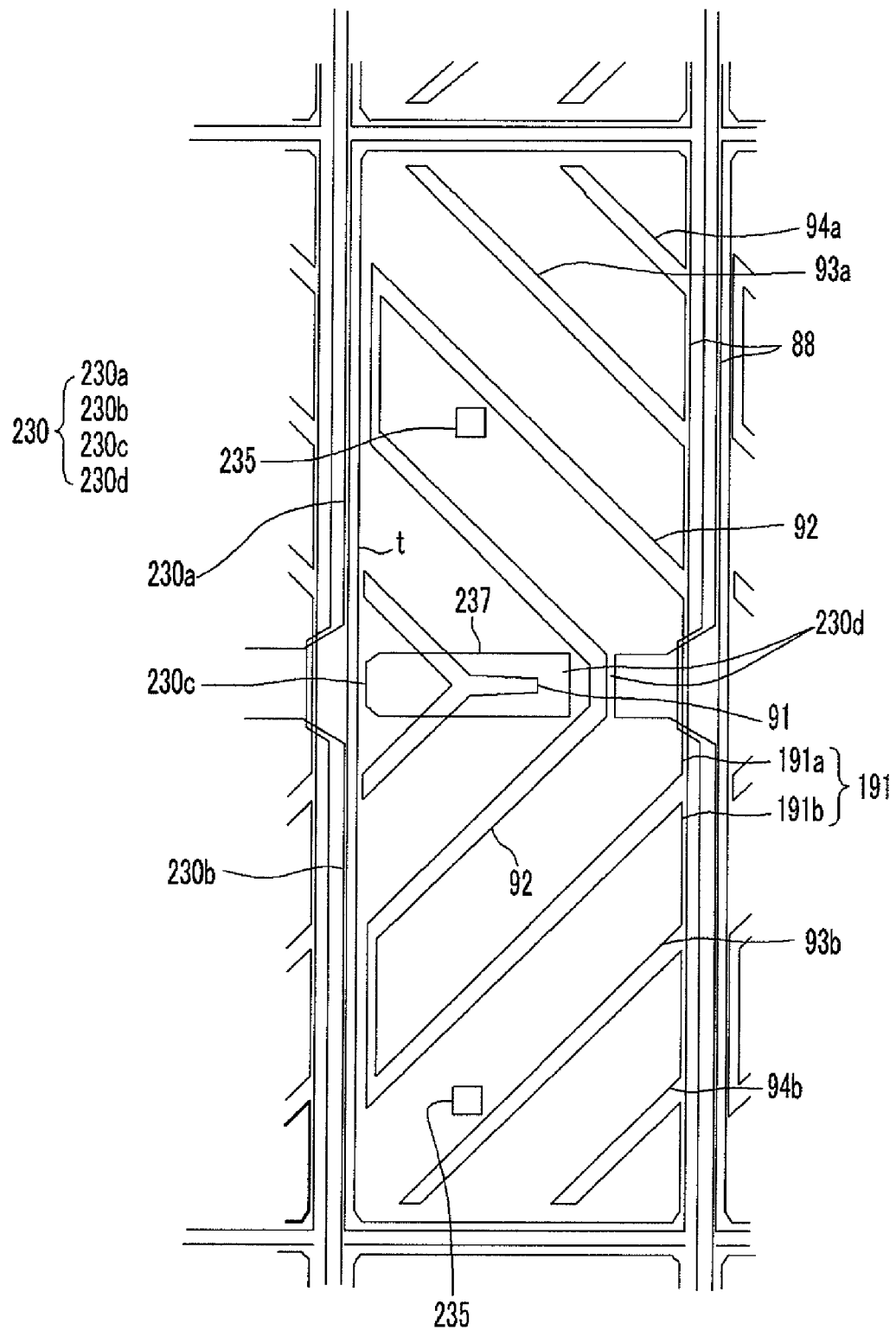
FIG. 3 is a layout view of pixel electrodes and color filters of an LCD according to an exemplary embodiment of the present invention.
Figure 4:
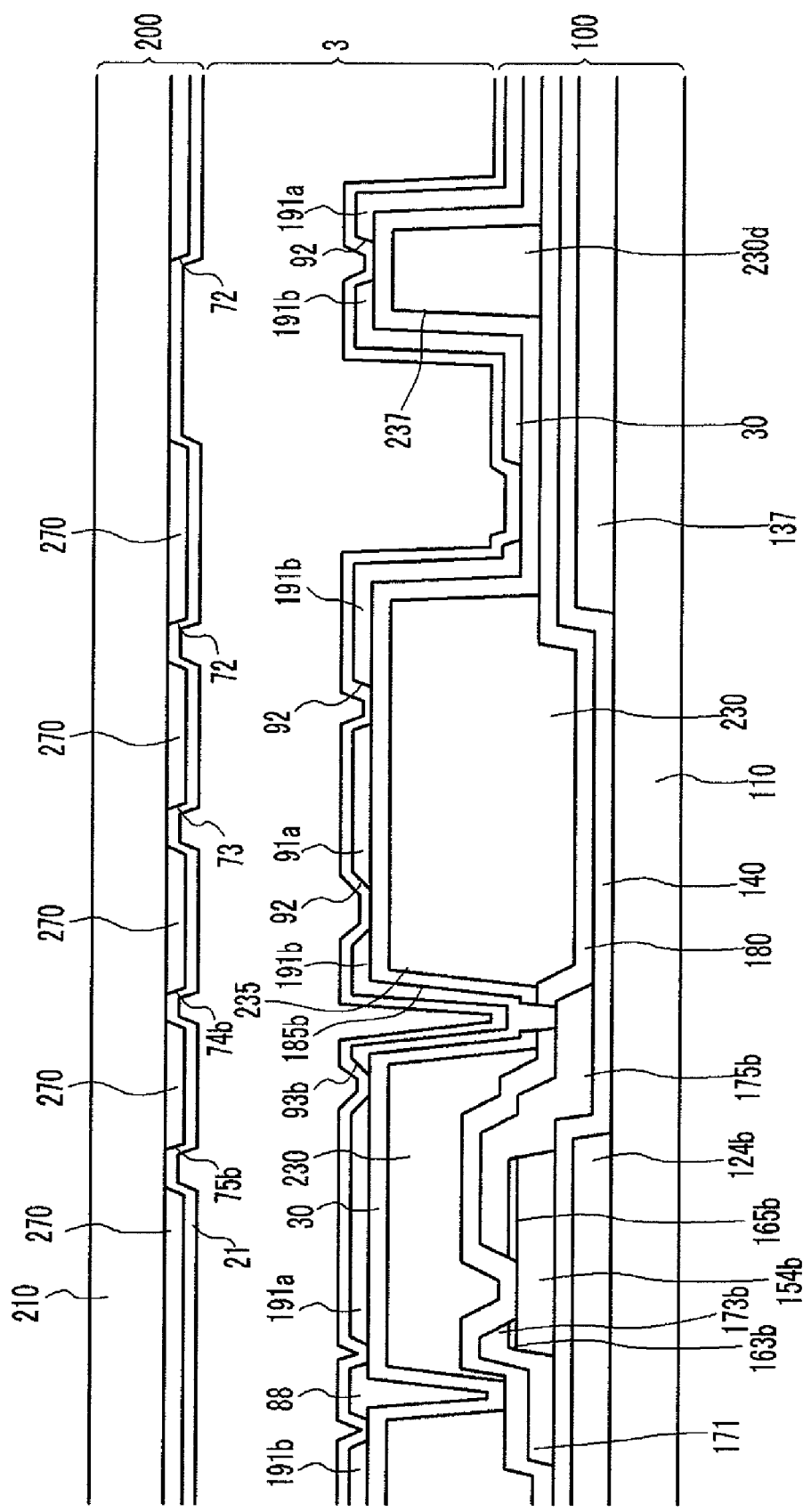
FIG. 4 is a cross-sectional view of the LCD shown in FIG. 2 taken along the line IV-IV.
Figure 5:
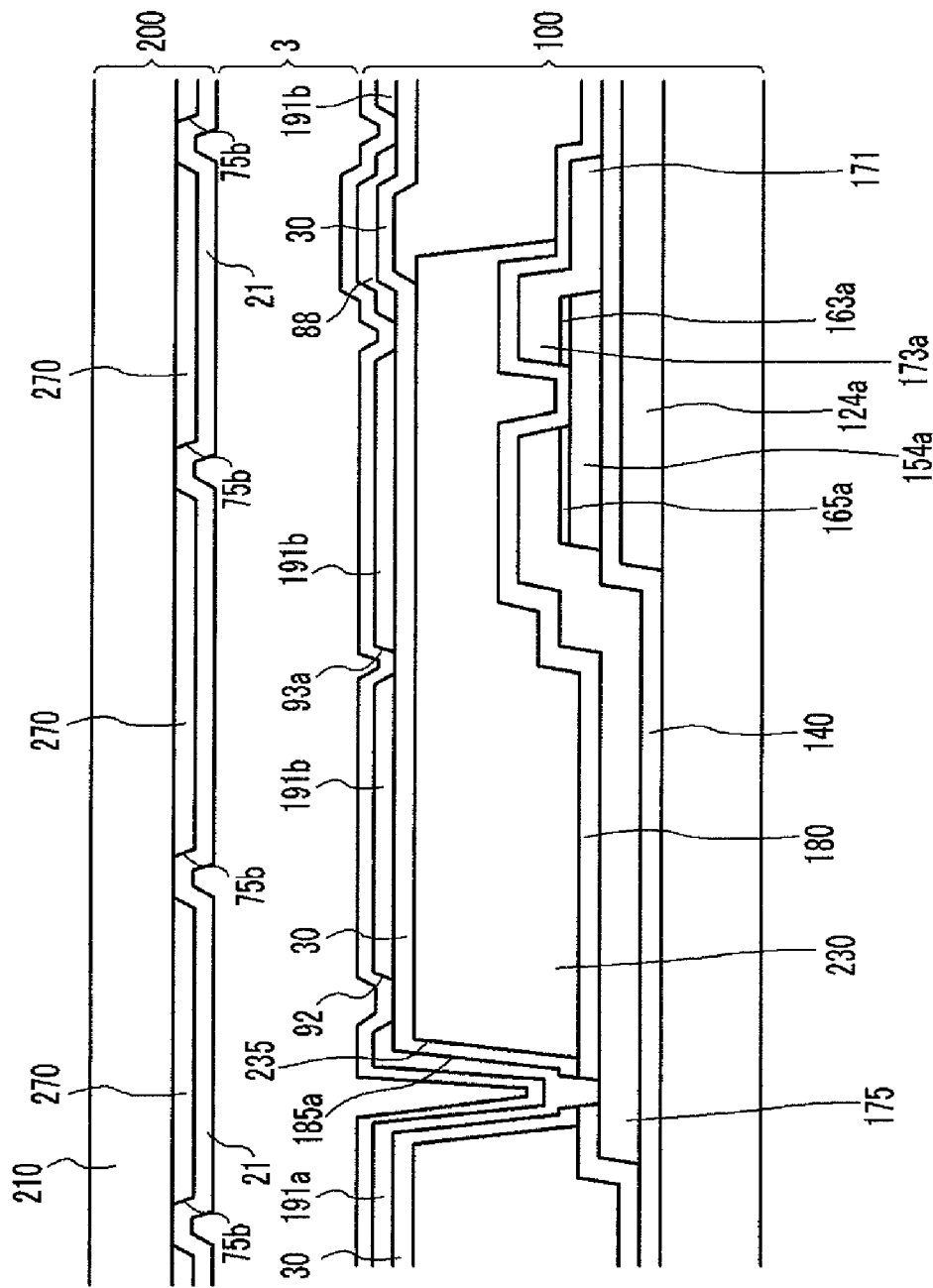
FIG. 5 is a cross-sectional view of the LCD shown in FIG. 2 taken along the line V-V.
Figure 6:
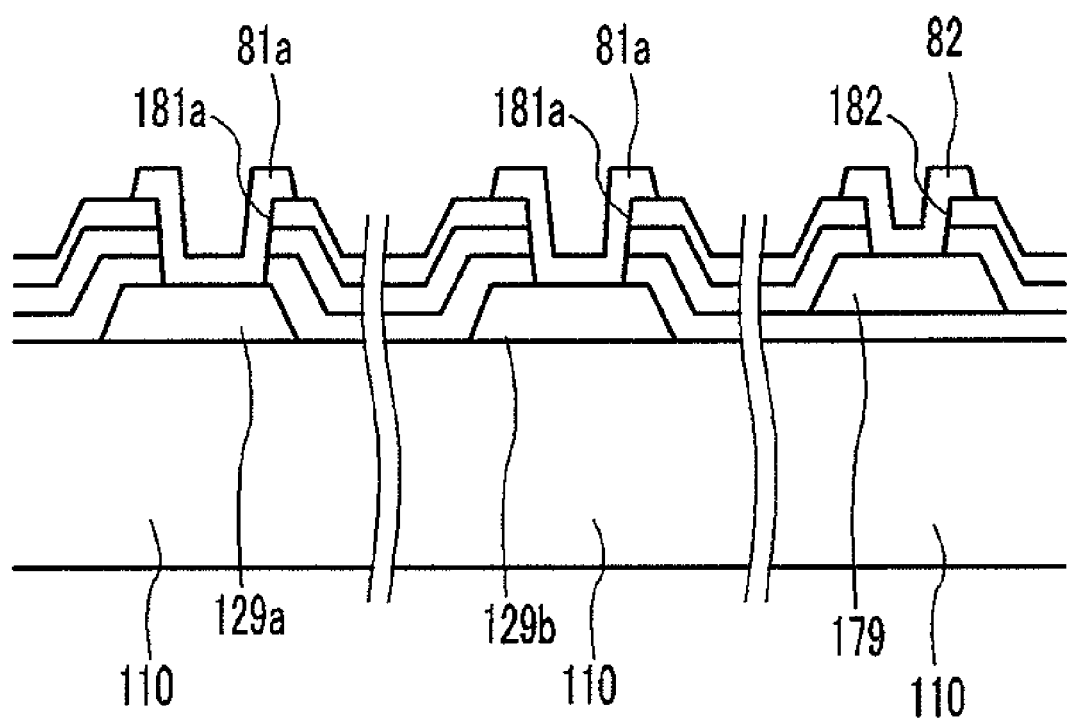
FIG. 6 is a cross-sectional view of the LCD shown in FIG. 2 taken along the line VI-VI.

FIG. 2 is a layout view of an LCD according to an exemplary embodiment of the present invention. FIG. 3 is a layout view of pixel electrodes and color filters of an LCD according to an exemplary embodiment of the present invention. FIG. 4 is a cross-sectional view of the LCD shown in FIG. 2 taken along the line IV-IV. FIG. 5 is a cross-sectional view of the LCD shown in FIG. 2 taken along the line V-V. FIG. 6 is a cross-sectional view of the LCD shown in FIG. 2 taken along the line VI-VI.

An LCD according to an exemplary embodiment of the present invention includes the TFT array panel 100 (lower panel), a common electrode panel 200 (upper panel), and an LC layer 3 interposed between the two panels 100 and 200.

Referring to FIGS. 2 to 6, a gate conductor including a plurality of gate lines 121a and 121b and a plurality of storage electrode lines 131 is formed on an insulating substrate 110 comprising a material such as, for example, transparent glass or plastic.

The gate lines 121a and 121b transmit gate signals and extend substantially in a transverse direction. Each of the gate lines 121a and 121b includes a plurality of first or second gate electrodes 124a or 124b projecting downwardly or upwardly and an end portion 129a or 129b having a large enough area for contacting another layer or an external driving circuit.

The storage electrode lines 131 are supplied with a predetermined voltage and extend substantially in the transverse direction. Each of the storage electrode lines 131 is disposed between two adjacent gate lines 121a and 121b, and is disposed at a substantially equal distance from the two adjacent gate lines 121a and 121b. Each storage electrode line 131 includes a plurality of storage electrodes 137 expanding upwardly and downwardly. The storage electrodes 137 are substantially rectangular-shaped and symmetrical with respect to the storage electrode lines 131.

A gate insulating layer 140 comprising, for example, silicon nitride (SiNx) or silicon oxide (SiOx) is formed on the gate conductor 121a, 121b, and 131.

A plurality of first and second semiconductor islands 154a and 154b comprising, for example, hydrogenated amorphous silicon ("a-Si") or polysilicon are formed on the gate insulating layer 140. The semiconductor islands 154a and 154b are disposed on the first and second gate electrodes 124a and 124b, respectively.

A plurality of ohmic contact islands 163a and 165a, and 163b and 165b, are formed on the respective semiconductor islands 154a and 154b. The ohmic contact islands 163, 165a, 163b, and 165b may comprise n+ hydrogenated a-Si heavily doped with an N-type impurity such as, for example, phosphorous. In an exemplary embodiment, the ohmic contact islands 163a, 165a, 163b and 165b may comprise silicide. The ohmic contact islands 163a and 165a, and the ohmic contact islands 163b and 165b, are located in pairs on the first and second semiconductor islands 154a and 154b, respectively.

A data conductor including plurality of data lines 171 and a plurality pairs of first and second drain electrodes 175a and 175b are formed on the ohmic contact islands 163a, 163b, 165a, and 165b, and the gate insulating layer 140.

The data lines 171 transmit data signals and extend substantially in the longitudinal direction to intersect the gate lines 121 and the storage electrode lines 131. Each of the data lines 171 includes a plurality of first and second source electrodes 173a and 173b projecting toward the first and second gate electrodes 124a and 124b, respectively, and an end portion 179 having a large enough area for contacting another layer or an external driving circuit.

The first and second drain electrodes 175a and 175b are separated from each other and are separated from the data line 171. Each of the drain electrodes 175a and 175b is disposed opposite the first or second source electrodes 173a or 173b with respect to the first and second gate electrodes 124a and 124b, respectively. Each drain electrode 175a and 175b includes an expansion. The drain electrodes 175a and 175b facing the source electrodes 173a and 173b are partially enclosed by the source electrodes 173a and 173b curved like a character C, respectively.

The first/second gate electrode 124a/124b, the first/second source electrode 173a/173b, and the first/second drain electrode 175a/175b along with the semiconductor island 154a/154b form a first/second TFT Qa/Qb. The first/second TFT Qa/Qb has a channel formed in the semiconductor island 154a/154b disposed between the first/second source electrode 173a/173b and the first/second drain electrode 175a/175b.

The ohmic contact islands 163a, 163b, 165a, and 165b are interposed between the underlying semiconductor islands 154a and 154b and the overlying data conductor 171 and the drain electrodes 175a and 175b thereon. The ohmic contact islands 163a, 163b, 165a and 165b reduce contact resistance between the underlying semiconductor islands 154a and 154b and the overlying data conductor 171 and the drain electrodes 175a and 175b. The semiconductor islands 154a and 154b include some exposed portions, which are not covered with the source electrodes 173a and 173b and the drain electrodes 175a and 175b, such as portions located between the source electrodes 173a and 173b and the drain electrodes 175a and 175b.

A passivation layer 180 is formed on the data lines 171, the drain electrodes 175a and 175b, and the exposed portions of the semiconductor islands 154a and 154b to protect the exposed portions of the semiconductor islands 154a and 154b. The passivation layer 180 may comprise, for example, silicon nitride.

A plurality of color filters 230 are formed on the passivation layer 180. The color filters 230 may include openings 235 and 237 and extend substantially in the longitudinal direction along the data lines 171. The color filters 230 may represent one of the primary colors such as red, green, and blue.

Referring to FIGS. 2 and 3, each of the color filters 230 includes first portions 230a disposed on lower portions with respect to the storage electrode lines 131, second portions 230b disposed on upper portions with respect to the storage electrode lines 131, and first and second connections 230c and 230d connecting the first portions 230a and the second portions 230b. Each first connection 230c crosses over the storage electrode line 131, and each second connection 230d crosses over the storage electrodes 137. A lower boundary of a first portion 230a and an upper boundary of a second portion 230b are disposed on the storage electrode 137.

Each first connection 230c includes a protrusion protruding to a second connection 230d of an adjacent color filter 230. Each first connection 230c is formed in portions of a pixel area neighboring the data line 171. When forming a first connection 230c on both sides of a pixel area, the color filters 230 of two adjacent pixel areas overlap such that a height difference occurs due to the protrusion. Thereby, in an exemplary embodiment, the first connection 230c is disposed only on the left side of a pixel area. Alternatively, the first connection 230c may be disposed only on the right side of a pixel area.

The openings 235 and 237 are formed on the drain electrodes 175a and 175b and the storage electrode 137 except for portions overlapping the first and second connections 230c and 230d. The openings 235 formed on the drain electrodes 175a and 175b facilitate formation of contact holes 185a and 185b, and the openings 237 formed on the storage electrodes 137 cause a thickness of a dielectric layer forming storage capacitance to be thin to improve the storage capacitance.

In an exemplary embodiment, in two adjacent color filters 230, edges of the first and second portions 230a and 230b and the first connections 230c of a color filter 230 overlap edges of the first and second portions 230a and 230b and the second connection 230d, respectively, but do not overlap each other.

A capping layer 30 comprising silicon nitride (SiNx) is formed on the color filters 230 to prevent contamination of an overlying layer due to a pigment included in the color filters 230.

The capping layer 30, the color filters 230, and the passivation layer 180 include contact holes 185a and 185b exposing the first and second drain electrodes 175a and 175b, respectively. The capping layer 30 and the passivation layer 180 include contact holes 182 exposing the end portions 179 of the data lines 171. The capping layer 30, the passivation layer 180, and the gate insulating layer 140 include contact holes 181a and 181b exposing the end portions 129a and 129b of the gate lines 121a and 121b, respectively.

A plurality of pixel electrodes 191, a plurality of contact assistants 81a, 81b, and 82, and a shielding electrode 88 are formed on the capping layer 30. Each of the pixel electrodes 191 includes sub-pixel electrodes 191a and 191b. The pixel electrodes 191 may comprise a transparent conductive material such as ITO and IZO, or a reflective conductor such as Ag, Al, Cr, and alloys thereof.

Referring to FIG. 3, each pixel electrode 191 has a substantially rectangular shape having four chamfered corners. The chamfered corners of the pixel electrode 191 make an angle of about 45 degrees with the gate lines 121a and 121b.

A pair of sub-pixel electrodes 191a and 191b forming a pixel electrode 191 engage with each other with respect to a gap 92. The first sub-pixel electrode 191a is approximately a rotated equilateral trapezoid, the base thereof being dented, and is substantially surrounded by the second sub-pixel electrode 191b. The second sub-pixel electrode 191b is shaped as an upper trapezoid, a lower trapezoid, and a center trapezoid connected to each other at a left side.

The second sub-pixel electrode 191b has cutouts 93a, 93b, 94a, and 94b extending from the top side of the upper trapezoid and the bottom side of the lower trapezoid to each right side thereof, respectively. The center trapezoid of the second sub-pixel electrode 191b is fitted into the dented base of the first sub-pixel electrode 191a. The second sub-pixel electrode 191b includes a center cutout 91 including a transverse portion and a pair of oblique portions connected thereto.

The transverse portion extends along an imaginary center transverse line of the second sub-pixel electrode 191b. The oblique portions extend from an end of the transverse portion to the left edge of the second pixel electrode 191b. The oblique portions make an angle of about 45 degrees with the storage electrode line 131.

A longitudinal boundary t of the center trapezoid of a second sub-pixel electrode 191b crossing the storage electrode line 131 is disposed on a first connection 230c of the color filter 230. In an exemplary embodiment, neighboring edges of two adjacent pixel electrodes 191 are positioned on the first connection 230c as well as the first and second portions 230a and 230b of the color filter 230 such that the entire edges of the two pixel electrodes 191 are disposed on the color filter 230.

When the boundaries of the two pixel electrodes 191 are disposed on portions with different heights formed due to the formation or non-formation of the color filter 230 or the overlapping or non-overlapping of two color filters 230, short circuiting of two adjacent pixel electrodes 191 due to inaccurate etching in an etching process for forming the pixel electrodes 191 is prevented.

The gap 92 between the first sub-pixel electrode 191a and the second sub-pixel electrode 191b includes two pairs of upper and lower oblique portions and a longitudinal portion. The longitudinal portion of the gap 92 crossing the storage electrode 137 is disposed on the second connection 230d of the color filter 230, and the upper and lower oblique portions are disposed on the first portion 230a and the second portion 230b of the color filter 230, respectively.

When the longitudinal portion of the gap 92 is disposed on a portion such as the opening 237, where the color filter 230 between the first portion 230a and the second portion 230b thereof is removed, the conductive layer forming the pixel electrodes 191 remains on the portions with different heights formed by the color filters 230 in a pattering process of the first sub-pixel electrode 191a and the second sub-pixel electrode 191b. Thus, the first sub-pixel electrode 191a and the second sub-pixel electrode 191b may be short circuited with each other.

However, according to an exemplary embodiment of the present invention, the entire portion to be formed as the gap 92 is disposed on the color filter 230 by forming the connection 230d such that the gap 92 is accurately etched. Accordingly, the short circuit of the first sub-pixel electrode 191a and the second sub-pixel electrode 191b is prevented.

The gap 92 is referred to as a cutout. The cutouts 91 to 94b substantially have inversion symmetry with respect to a storage electrode line 131. The cutouts 91 to 94b make an angle of about 45 degrees with the gate lines 121a and 121b. The cutouts 91 to 94b extend substantially perpendicular to each other. The pixel electrode 191 is partitioned into a plurality of partitions by the cutouts 91-94b.

Accordingly, the pixel electrode 191 is horizontally bisected around the storage electrode line 131, and the upper half and the lower half of the pixel electrode 191 are partitioned into a plurality of partitions by the cutouts 91 to 94b, respectively.

The number of partitions or the number of cutouts is varied depending on design factors such as, for example, the size of pixel electrodes 191, the ratio of the transverse edges and the longitudinal edges of the pixel electrode 191, the type and characteristics of the LC layer 3.

The first and second sub-pixel electrodes 191a and 191b are physically and electrically connected to the first and second drain electrodes 175a and 175b through the contact holes 185a and 185b such that the first and second sub-pixel electrodes 191a and 191b receive data voltages from the first and second drain electrodes 175a and 175b, respectively. A pair of the sub-pixel electrodes 191a and 191b are supplied with different data voltages predetermined based on an input image signal, respectively. The magnitudes of the data voltages may be determined depending upon the sizes and shapes of the sub-pixel electrodes 191a and 191b. Furthermore, the areas of the sub-pixel electrodes 191a and 191b may differ from each other. For instance, the first sub-pixel electrode 191a receives a voltage that is higher than that of the second sub-pixel electrode 191*b*, and the first sub-pixel electrode 191*a* is smaller in area than the second sub-pixel electrode 191*b*.

The sub-pixel electrodes 191*a* and 191*b* supplied with the data voltages and a common electrode 270 of the common electrode panel 200 supplied with a common voltage form first and second capacitors Clca and Clcb ("liquid crystal capacitors"), which store applied voltages after the TFT turns off. Each of the liquid crystal capacitors Clca and Clcb includes the LC layer 3 as a dielectric layer.

The first and second sub-pixel electrodes 191*a* and 191*b* and the drain electrodes 175*a* and 175*b* connected thereto and the storage electrode line 131 including a storage electrode 137 form additional capacitors Csta and Cstb ("storage capacitors"), which enhance the voltage storing capacity of the LC capacitors Clca and Clcb, respectively.

The contact assistants 81*a*, 81*b*, and 82 are connected to the end portions 129*a* and 129*b* of the gate lines 121*a* and 121*b* and the end portions 179 of the data lines 171 through the contact holes 181*a*, 181*b*, and 182, respectively. The contact assistants 81*a*, 81*b*, and 82 protect the end portions 129*a*, 129*b*, and 179 and enhance the adhesion between the end portions 129*a*, 129*b*, and 179, and external devices.

The shielding electrode 88 is supplied with the common voltage. The shielding electrode 88 includes longitudinal portions extending along the data lines 171 and transverse portions extending along the first and second gate lines 121*a* and 121*b*. The longitudinal portions substantially cover the data lines 171. The transverse portions connect two adjacent longitudinal portions to each other. The transverse portions are formed within the boundary of the gate lines 121*b*. The shielding electrode 88 blocks electric fields generated between the data lines 171 and the pixel electrodes 191 and between the data lines 171 and the common electrode 270 to reduce distortion of the voltage of the pixel electrode 191 and signal delay of the data voltages transmitted by the data lines 171.

Most edges of the shielding electrode 88 are disposed on the color filters 230.

That is, two sides of the shielding electrode 88 covering the gate lines 121*a* and 121*b* are disposed on the color filters 230 of pixel areas positioned upwardly and downwardly with respect to the gate lines 121*a* and 121*b*. Two sides of the shielding electrode 88 covering the data lines 171 are disposed on the color filters 230 positioned left and right of the data lines 171.

In an exemplary embodiment, since the color filters 230 longitudinally extend along pixel rows, the two sides of the portions of the shielding electrode 88 covering the gate lines 121 are disposed on the same pixel color filter 230. The two sides of the shielding electrode 88 covering the data lines 171 are respectively disposed on different pixel color filters 230 formed in two adjacent pixel areas with respect to the data lines 171, respectively. Since the first connections 230*c* are formed to the next pixel areas crossing over the data lines 171, two sides of the shielding electrode 88 overlapping the first connections 230*c* are disposed on the same first connections 230*c* where the first connections 230*c* of the color filters 230 are formed.

Since the entire sides of the shielding electrode 88 are disposed on the flat color filters 230, an accurate etching process for forming the shielding electrode 88 is performed, and thereby a short circuit between the shielding electrode 88 and pixel electrodes 191 adjacent to the shielding electrode 88 is prevented.

The common electrode 270 is formed on an insulating substrate 210 comprising a material such as transparent glass or plastic. The common electrode 270 may comprise a transparent conductive material such as ITO and IZO. A light blocking member (not shown) may be formed between the substrate 210 and the common electrode 270. The light blocking member may be formed on portions overlapping the first and second semiconductor islands 154*a* and 154*b*. The light blocking member prevents light leakage. The light blocking member may be selectively formed on portions where light leaks and on the semiconductor islands 154*a* and 154*b*.

The common electrode 270 has a plurality of sets of cutouts 71, 72, 73, 74*a*, 74*b*, 75*a*, 75*b*, 76*a*, and 76*b*.

A set of cutouts 71 to 76*b* face the pixel electrode 191 and include center cutouts 71 to 73, upper cutouts 74*a*, 75*a*, and 76*a*, and lower cutouts 74*b*, 75*b*, and 76*b*. Each of the cutouts 71 to 76*b* is disposed between adjacent cutouts 91 to 94*b* of the pixel electrode 191 or between a cutout 91-94*b* and a chamfered edge of the pixel electrode 191. Each of the cutouts 71 to 76*b* has at least an oblique portion extending parallel to the upper cutout 93*a*, 94*a*, 95*a*, or 96*a*, or the lower cutout 93*b*, 94*b*, 95*b*, or 96*b* of the pixel electrode 191.

The oblique portions of the upper and lower oblique cutouts 74*a* and 74*b* extend approximately from right edges to left and upper edges or lower corners of the pixel electrodes 191. The oblique portions of the upper and lower cutouts 75*a* and 75*b* and the oblique portions of the upper and lower cutouts 76*a* and 76*b* extend approximately from right edges to left edges or lower edges of the pixel electrodes 191. The oblique portions of the upper and lower cutouts 74*a*-76*b* include terminal transverse or terminal longitudinal portions extending from respective ends of the oblique portions of the upper and lower cutouts 74*a*-76*b* along the edges of the pixel electrodes 191, overlapping the edges thereof, and making obtuse angles with the oblique portion.

Each of the center cutouts 71 and 72 includes a center transverse portion and a pair of oblique portions. The center transverse portion extends approximately from a right edge of the pixel electrode 191 leftward along the storage electrode line 131. The oblique portions extend from an end of the central transverse portion approximately to the left edge of the pixel electrode 191 and approximately parallel to the respective lower and upper cutouts 74*a* to 76*b*.

The center cutout 73 includes a longitudinal portion and an oblique portion. The longitudinal portion overlaps the storage electrode 137, and the oblique portion approximately extends from both ends of the longitudinal portions to the left edge of the pixel electrode 191 and parallel to the upper and lower cutouts 74*a*-76*b*.

Each of the center cutouts 72 and 73 includes terminal longitudinal portions. The terminal longitudinal portions extend from the ends of the respective oblique portions along the left edge of the pixel electrode 191, overlapping the left edge of the pixel electrode 191, and making obtuse angles with the respective oblique portions.

The oblique portions of the cutouts 72 to 76*b* include triangular-shaped notches 7. The notches 7 may be formed in the shape of, for example, a rectangle, a trapezoid, or a semicircle. The notches 7 may be convex or concave. The notches 7 determine the tilt directions of LC molecules 31 of the LC layer 3 located at the regional boundary corresponding to the cutouts 72 to 74*b*.

The number and the arrangements of the cutouts 71 to 76*b* may also be varied depending on design factors.

Alignment layers 11 and 21 may be coated on inner surfaces of the panels 100 and 200. The alignment layers 11 and 21 may be vertical alignment layers.

Figure 7:
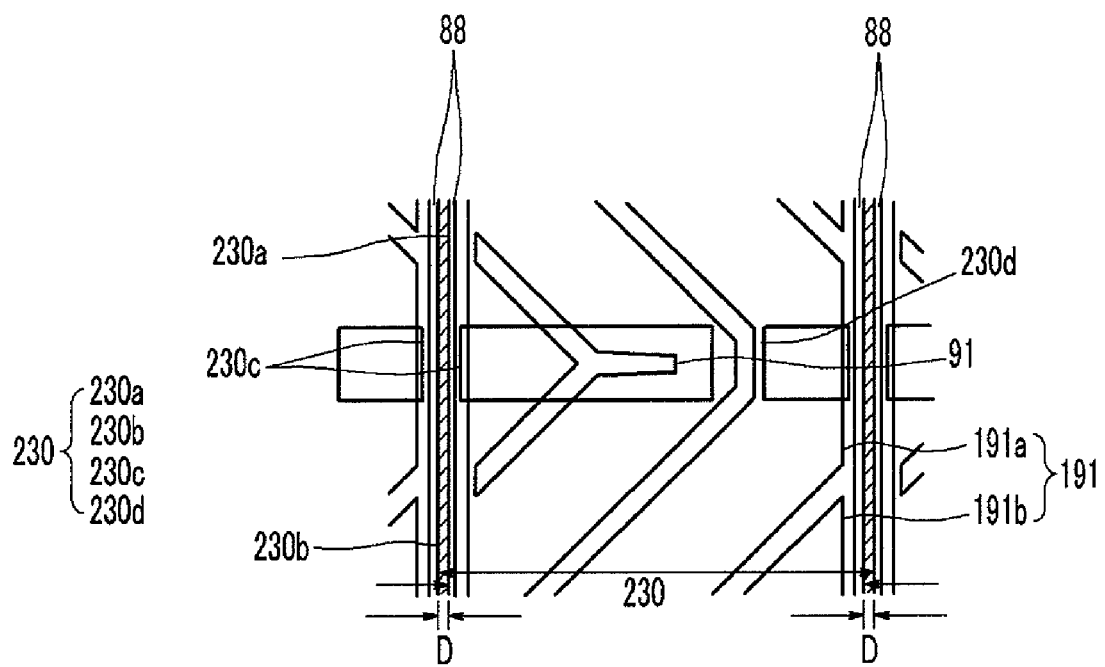
FIG. 7 is a top plan view of portions a pixel electrode, a color filter, and a shielding electrode near a portion of a storage electrode line according to an exemplary embodiment of the present invention.

FIG. 7 is a top plan view of portions of a pixel electrode, a color filter, and a shielding electrode near a portion of a storage electrode line according to an exemplary embodiment of the present invention.

Referring to FIG. 7, color filters 230 extend in a column direction. The boundaries of the color filters 230 are disposed on the data lines 171.

Right boundaries of the first portions 230a and the second portions 230b of a color filter 230 are closer to a right boundary of a data line 171 than those of left boundaries of the first portions 230a and the second portions 230b of the neighboring color filters 230. Left boundaries of the first portions 230a and the second portions 230b of the color filter 230 are closer to a left boundary of the data line 171 than those of right boundaries of the first portions 230a and the second portions 230b of the neighboring color filters 230. That is, left and right boundaries of two adjacent color filters 230 overlap to form overlapping regions D, and each overlapping region D has a height that is higher than that of the remaining portion.

The first connections 230c are formed on left and right portions with respect to the storage electrode 137, and the boundaries of two adjacent first connections 230c overlap each other to form overlapping regions D. In an exemplary embodiment, a first connection 230c does not protrude toward a neighboring pixel electrode 191 but straightly extends along the data lines 171. Thereby, each of the overlapping regions D has a minimum size of a straight-shape, and two edges of the shielding electrode 88 formed along the data line 171 are formed on the color filters 230 out of the overlapping region D.

Thus, since two edges of the shielding electrode 88 are formed on the flat first connection 230c out of the overlapping region D, an etching process for forming the shielding electrode 88 is facilitated and performed to form the shielding electrode 88. Accordingly, the short circuit of the shielding electrode 88 and the pixel electrodes 191 adjacent thereto is prevented.

Alternatively, the first connection 230c may be expanded to a boundary of the pixel electrode 191 and a lower portion of the shielding electrode 88.

An LCD according to an exemplary embodiment of the present invention is described with reference to FIGS. 8 to 13.

Figure 8:
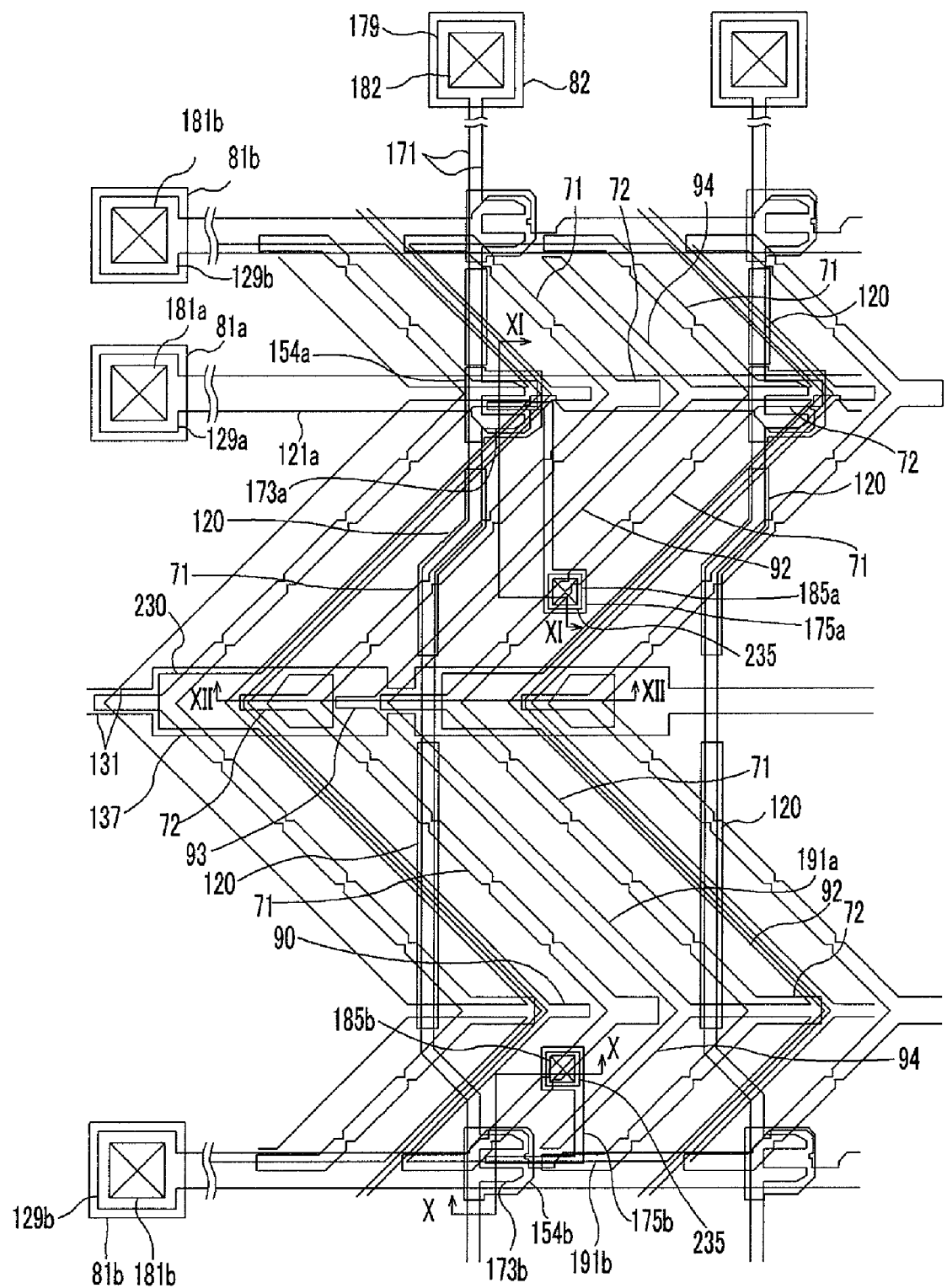
FIG. 8 is a layout view of an LCD according to an exemplary embodiment of the present invention.
Figure 9:
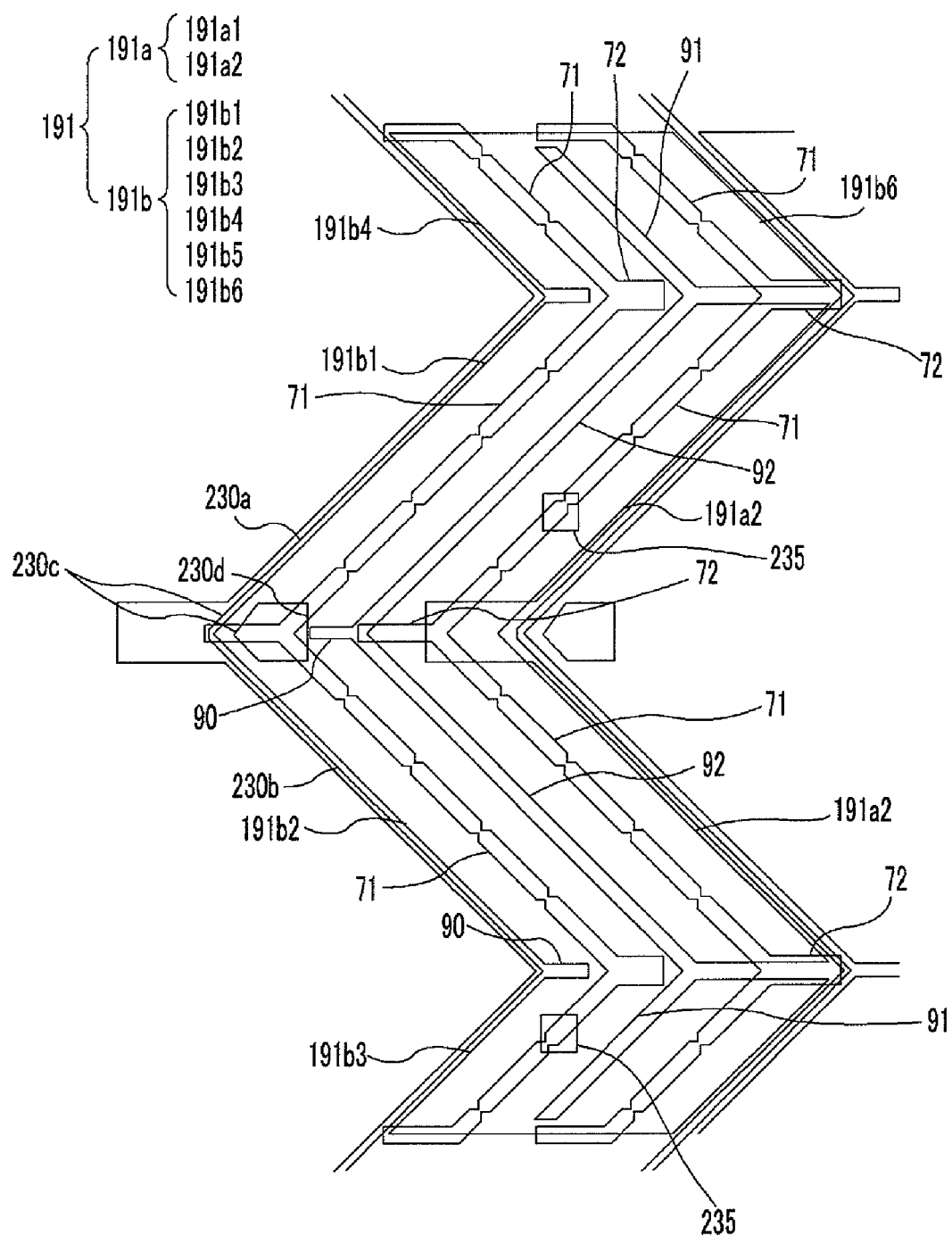
FIG. 9 is a layout view of cutouts of pixel electrodes, color filters, and a common electrode of an LCD according to an exemplary embodiment of the present invention.
Figure 10:
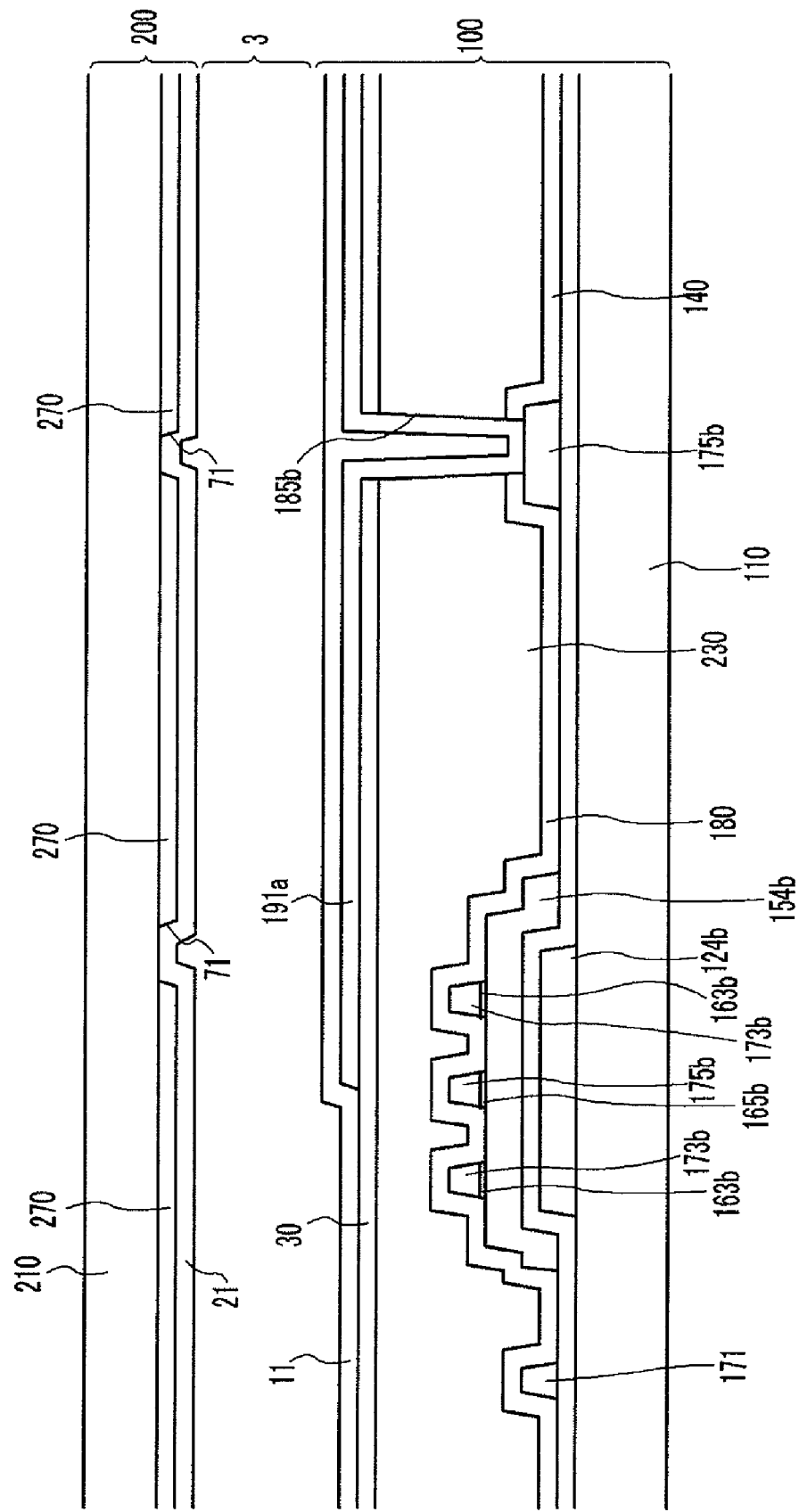
FIG. 10 is a cross-sectional view of the LCD shown in FIG. 8 taken along the line X-X.
Figure 11:
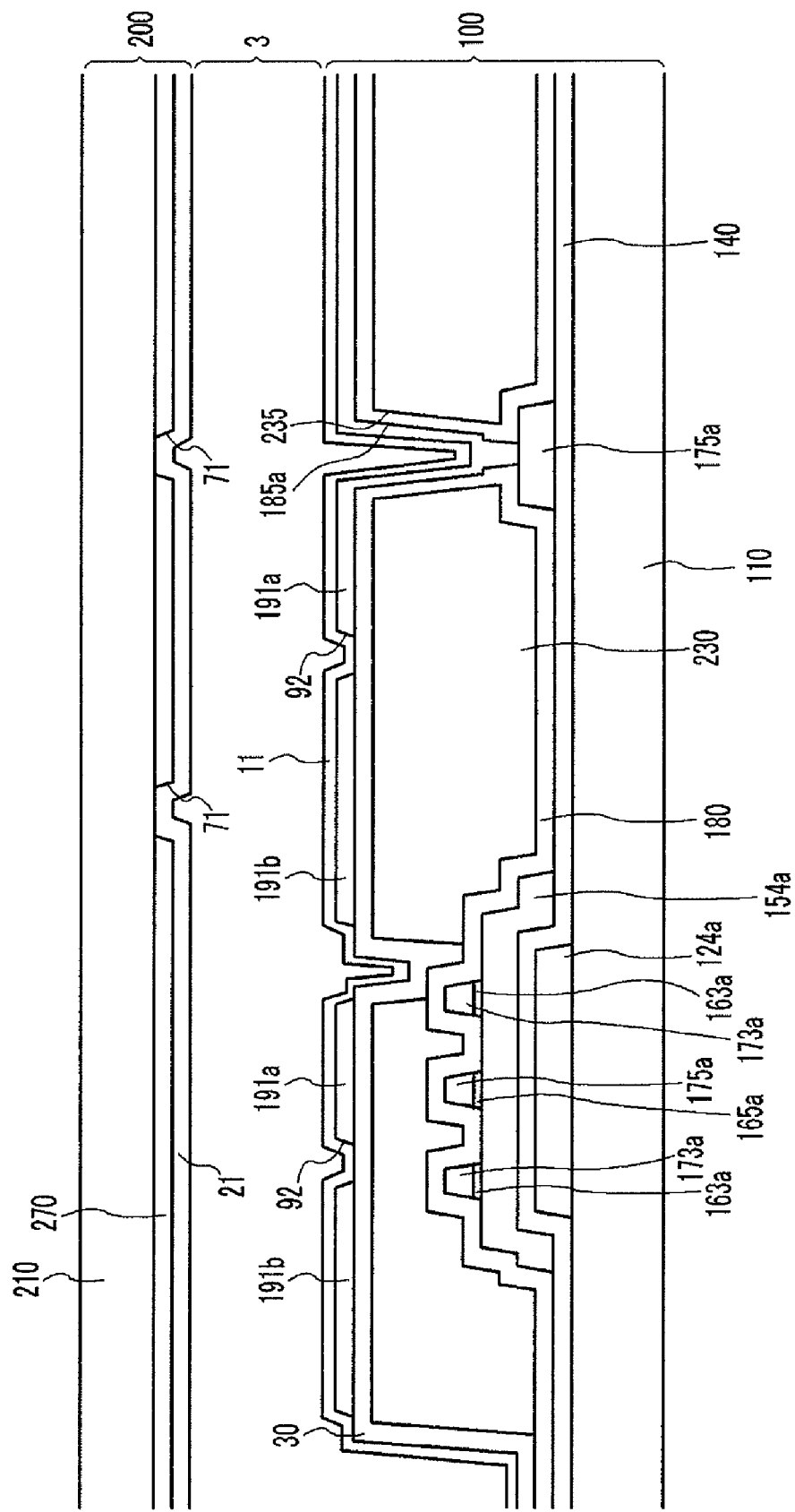
FIG. 11 is a cross-sectional view of the LCD shown in FIG. 8 taken along the line XI-XI.
Figure 12:
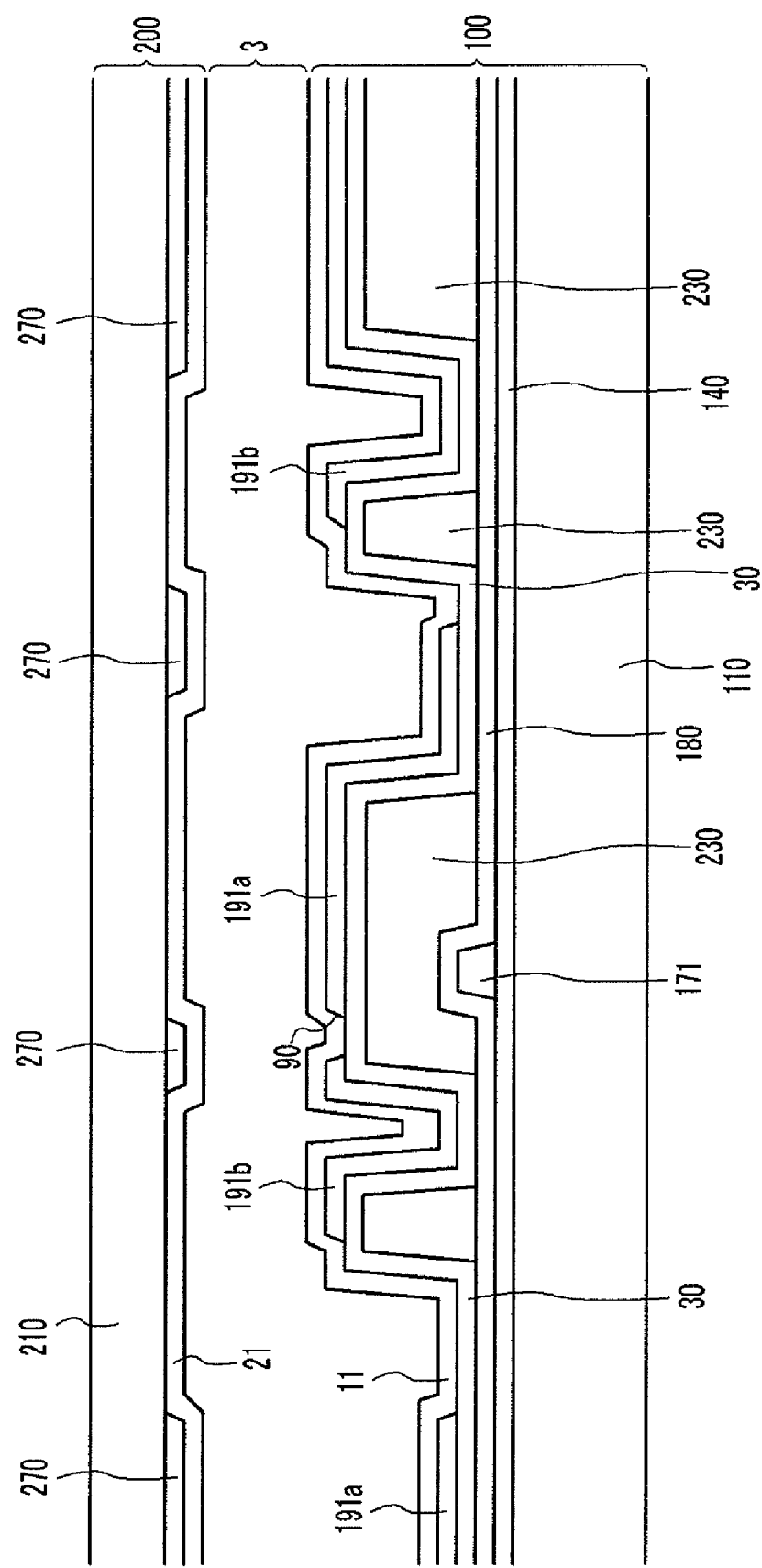
FIG. 12 is a cross-sectional view of the LCD shown in FIG. 8 taken along the line XII-XII.
Figure 13:
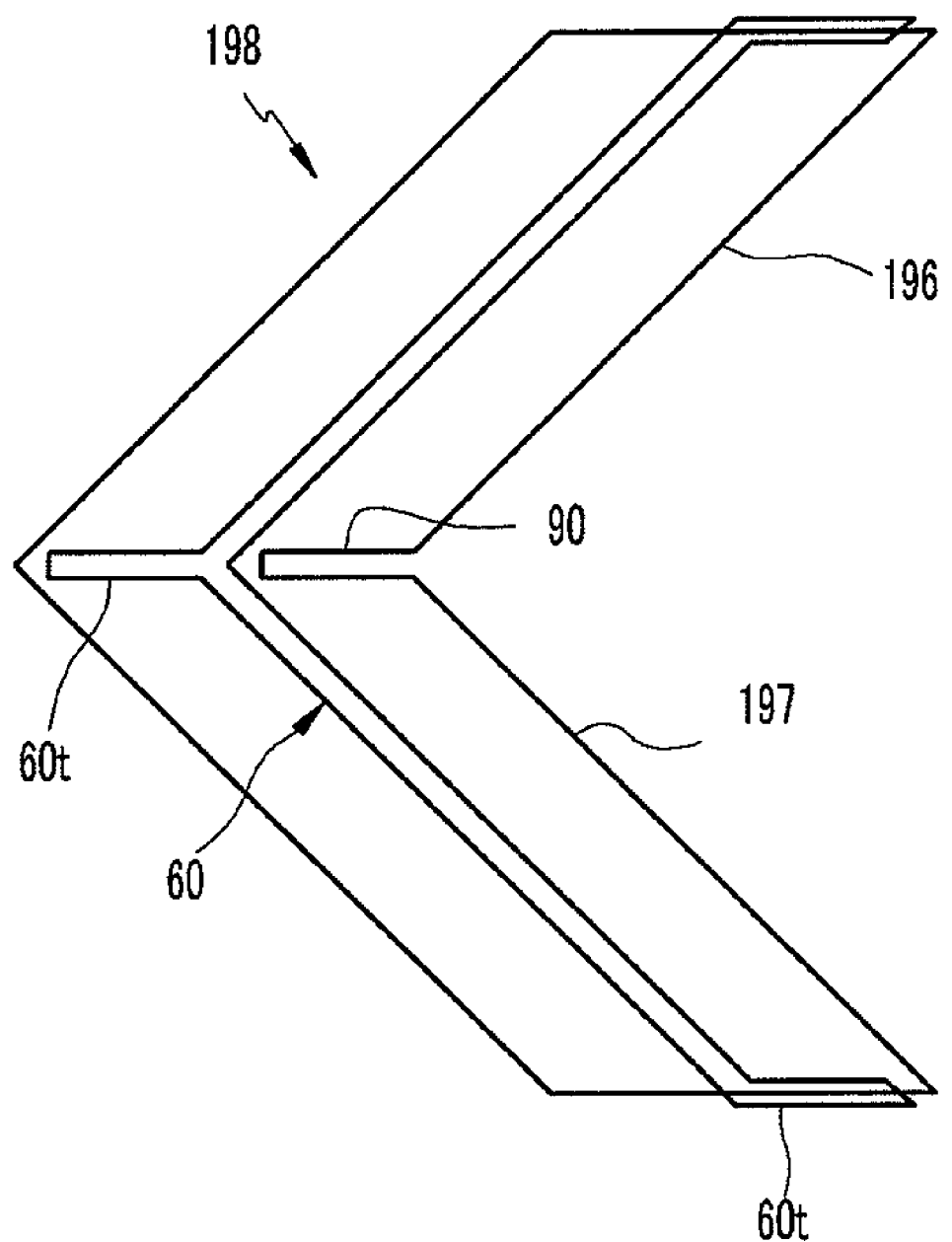
FIG. 13 is a top plan view of portions of pixel electrodes of an LCD according to an exemplary embodiment of the present invention.

FIG. 8 is a layout view of an LCD according to an exemplary embodiment of the present invention. FIG. 9 is a layout view of cutouts of pixel electrodes, color filters, and a common electrode of an LCD according to an exemplary embodiment of the preset invention. FIG. 10 is a cross-sectional view of the LCD shown in FIG. 8 taken along the line X-X. FIG. 11 is a cross-sectional view of the LCD shown in FIG. 8 taken along the line XI-XI. FIG. 12 is a cross-sectional view of the LCD shown in FIG. 8 taken along the line XII-XII. FIG. 13 is a top plan view of portions of pixel electrodes of an LCD according to an exemplary embodiment of the present invention.

Referring to FIGS. 8 to 12, in a lower panel, the plurality of first and second gate lines 121a and 121b including the first and second gate electrodes 124a and 124b and the end portions 129a and 129b, and the plurality of storage electrode lines 131 including the storage electrodes 137, are formed on the substrate 110. A light blocking layer 120 is formed on the substrate 110. The light blocking layer 120 includes a plurality of sub-light blocking layers.

The sub-light blocking layers of the light blocking layer 120 extend approximately in a longitudinal direction. Each of the sub-light blocking layers is separate from each other. The light blocking layer 120 is divided into a plurality of portions such that the light blocking layer 120 is not short circuited by the first and second gate lines 121a and 121b and the storage electrode lines 131.

The gate insulating layer 140 is formed on the gate conductor 120, 121a, 121b, and 131.

A plurality of first and second semiconductor islands 154a and 154b overlapping the first and second gate electrodes 124a and 124b, respectively, are formed on the gate insulating layer 140. A plurality of ohmic contact islands 163a, 163b, 165a, and 165b are formed on the semiconductor islands 154a and 154b.

A data conductor including a plurality of data lines 171 having source electrodes 173 and end portions 179 and a plurality of pairs of first and second drain electrodes 175a and 175b is formed on the ohmic contact islands 163a, 163b, 165a, and 165b and the gate insulating layer 140.

Each of the data lines 171 extends substantially in a longitudinal direction to intersect the gate lines 121a and 121b and the storage electrode lines 131. Each of the data lines 171 includes at least two curved portions. Each of the data lines 171 overlaps the sub-light blocking layers of the light blocking layer 120. Some of the sub-light blocking layers of the light blocking layer 120 have curved portions along the data lines 171, and a width of the sub-light blocking layers may be equal to or greater than that of the data line 171.

A passivation layer 180 comprising, for example, silicon nitride is formed on the data conductor 171, 175a, and 175b and the exposed portions of the semiconductor islands 154a and 154b, and the plurality of color filters 230 are formed on the passivation layer 180.

Referring to FIGS. 8 and 9, each of the color filters 230 includes first portions 230a disposed on lower portions with respect to the storage electrode lines 131, second portions 230b disposed on upper portions with respect to the storage electrode lines 131, and first and second connections 230c and 230d connecting the first portions 230a and the second portions 230b. Each first connection 230c crosses over the storage electrode line 131, and each second connection 230d crosses over the storage electrodes 137. A lower boundary of a first portion 230a and an upper boundary of a second portion 230b are disposed on the storage electrode 137.

Except for portions overlapping the first and second connections 230c and 230d, the color filters 230 are not formed on most parts of the storage electrodes 137. Thereby, a thickness of a dielectric layer for forming a storage capacitance material is reduced to improve the storage capacitance.

Referring to FIG. 8, the left and right boundaries of the color filters 230 are disposed on the data lines 171. The color filters 230 are curved along the data lines 171.

The capping layer 30 is formed on the color filters 230. The capping layer 30, the passivation layer 180, and the gate insulating layer 140 include contact holes 181a, 181b, 182, 185a, and 185b.

A plurality of pixel electrodes 191 and a plurality of contact assistants 81a, 81b, and 82 are formed on the capping layer 30.

Each of the pixel electrodes 191 includes a pair of first and second sub-pixel electrodes 191a and 191b separated from each other.

Each first sub-pixel electrode 191a is connected to each first drain electrode 175a through each contact hole 185a, and each second sub-pixel electrode 191b is connected to each second drain electrodes 175b through each contact hole 185b.

The entire data line 171 overlaps a pixel electrode 191 adjacent thereto. Since a pixel electrode 191 has the curved portions, a data line 171 overlaps all of the pixel electrode 191 connected to the data line 171 through first and second TFTs Qa and Qb and an adjacent pixel electrode 191.

Referring to FIG. 8 and FIGS. 9 to 13, each pixel electrode 191 includes the pair of first and second sub-pixel electrodes 191a and 191b. The pair of the first and second sub-pixel electrodes 191a and 191b can be separated and positioned apart from each other. The first sub-pixel electrode 191a and the second sub-pixel electrode 191b are adjacent in a row direction and include cutouts 94, 92, and 93. The common electrode 270 is opposite to the first and second sub-pixel electrodes 191a and 191b and includes cutouts 71 and 72.

The first and second sub-pixel electrodes 191a and 191b include at least one base electrode 198 shown in FIG. 13, and have a structure based on the base electrode 198, respectively.

The base electrode 198 shown in FIG. 13 is formed by combining respective transverse edges of a right-inclined electrode piece 196 and a left-inclined electrode piece 197. The angle formed by combining the right-inclined electrode piece 196 with the left-inclined electrode piece 197 is about a right angle, and the connection between the electrode pieces 196 and 197 includes connection of only portions of the respective transverse edges. The proximately facing transverse edge portions of the electrode pieces 196 and 197, which are not connected to each other, form a cutout 90 disposed at a concavity. The cutout 90 may be omitted.

A cutout 60 of the common electrode 270 extends substantially in parallel to inclined boundaries of the right-inclined electrode piece 196 and the left-inclined electrode piece 197. The cutout 60 includes transverse portions each of which is parallel to a transverse boundary of each of the electrode pieces 196 and 197, and the transverse boundaries of the electrode pieces 196 and 197 combine to form a transverse portion 60t. A portion of the cutout 60 bisects the base electrode 198 into a left half and a right half, and the transverse portion 60t bisects the base electrode 198 into an upper half and a lower half.

The base electrode 198 and the cutout 60 have an inversion symmetry with respect to an imaginary center transverse line.

In each pixel electrode 191 shown in FIG. 9, the first sub-pixel electrode 191a has a smaller size than that of the second sub-pixel electrode 191b. The second sub-pixel electrode 191b has a larger height than that of the first sub-pixel electrode 191a. The number of right-inclined electrode pieces 196 and left-inclined electrode pieces 197 forming the second sub-pixel electrode 191b is larger than that of the first sub-pixel electrode 191a.

Each first sub-pixel electrode 191a is formed of the left-inclined electrode piece 197 and the right-inclined electrode piece 196 and has substantially the same shape as that of the base electrode 198 shown in FIG. 13.

The second sub-pixel electrode 191b is formed by combining at least two left-inclined electrode pieces 197 and at least two right-inclined electrode pieces 196. That is, the second sub-pixel electrode 191b includes the base electrode 198 shown in FIG. 13 and the left-inclined and right-inclined electrode pieces 196 and 197 combined with the base electrode 198.

The second sub-pixel electrode 191b shown in FIG. 9 includes six electrode pieces 191b1-191b6, and two electrode pieces 191b5 and 191b6 are disposed on upper and lower portions of the first sub-pixel electrode 191a, respectively. Two electrode pieces 191b3 and 191b5 disposed on the upper portion and two electrode pieces 191b4 and 191b6 disposed on the lower portion are connected at portions of oblique sides thereof, and the remaining portions of the oblique sides, at which the electrode pieces 191b3 and 191b5 and the electrode pieces 191b4 and 191b6 are not connected, form oblique cutouts 94.

Middle electrode pieces 191b1 and 191b2 of the first sub-pixel electrode 191a and the second sub-pixel electrode 191b are separated from each other with respect to the gap 92. The gap 92 is connected to upper and lower oblique cutouts 94 of the pixel electrode 191.

Referring to FIG. 13, the cutouts 90 are formed at the electrode pieces 196 and 197, the cutout connected to the gap 92 forms a transverse cutout 93 of the second sub-pixel electrode 192b. The transverse cutout 93 is formed as a dented shape toward the second sub-pixel electrode 191b at a curved portion of the gap 92 and is disposed on the storage electrode 137.

The pixel electrode 191b has a three-curved structure to improve vertical representation compared with a one-curved structure. The middle electrode pieces 191a1, 191a2, 191b1, and 191b2 have different heights from those of the electrode pieces 191b13-191b6 disposed on upper or lower portions thereof. In an exemplary embodiment, heights of the upper and lower electrodes pieces 191b3-191b6 are about half of those of the middle electrode pieces 191a1, 191a2, 191b1, and 191b2, and thereby an area ratio of the first sub-pixel electrode 191a and the second sub-pixel electrode 191b is about 1:2. Thus, by adjusting the heights of the upper and lower electrodes pieces 191b3-191b6, a desired area ratio is obtained.

The position and the curved direction of the sub-pixel electrodes 191a and 191b shown in FIG. 9 may be changed, and the configurations shown in FIG. 9 may be modified by moving the pixel electrodes 191 with an inversion symmetry or by rotating the pixel electrodes 191.

In FIG. 9, each of the color filters 230 includes first portions 230a disposed on lower portions with respect to the storage electrode lines 131, second portions 230b disposed on upper portions with respect to the storage electrode lines 131, and first and second connections 230c and 230d connecting the first portions 230a and the second portions 230b.

Each first connection 230c is disposed on a portion at which left edges of the middle electrode pieces 191b1 and 191b2 of the second sub-pixel electrode 191b are joined. Each first connection 230c is curved along the left edges of the middle electrode pieces 191b1 and 191b2 of the second sub-pixel electrode 191b. By forming the first connection 230c on both sides of a pixel area, right edges of two middle electrode pieces 191a1 and 191a2 of the second sub-pixel electrode 191b and left edges of two middle electrode pieces 191b1 and 191b2 of the second sub-pixel electrode 191b are disposed on the first connection 230c to prevent short circuiting of two adjacent pixel electrodes 191.

However, even if one of the left edges of the middle electrode pieces 191b1 and 191b2 of the second sub-pixel electrode 191b or the right edges of the middle electrode pieces 191a1 and 191a2 of the first sub-pixel electrode 191a is disposed on the first connection 230c, the short circuiting of two adjacent pixel electrodes 191 may be prevented. That is, since the edge disposed on the first connection 230c is fully patterned, disconnection between two adjacent pixel electrodes 191 is precisely performed.

In an exemplary embodiment, each first connection 230c is disposed only on a left portion of a pixel area. Alternatively, each first connection 230c may be disposed only on a right portion of a pixel area or on left and right portions of a pixel area.

Each second connection 230d is disposed under the gap 92 of the first sub-pixel electrode 191a and the second sub-pixel electrode 191*b* and a transverse cutout 93. By forming the connections 230*d*, the entire portion to be formed into the gaps 92 and the transverse cutouts 93 is disposed on the color filters 230, and the gaps 92 and the transverse cutouts 93 are precisely etched. Thereby, the short circuit of the first sub-pixel electrode 191*a* and the second sub-pixel electrode 191*b* are prevented.

A width of each sub-light blocking layer of the light blocking layer 120 may be larger than that of a data line 171 regarding an aperture ratio and an arrangement error of processes, but may be the same as that of a data line 171.

Referring to FIGS. 8 to 12, the common electrode 270 is formed on a substrate 210.

The common electrode 270 includes a plurality of cutouts 71 and 72. The cutouts 71 and 72 have notches 7. The cutouts 60 and 60*t* of the base electrode 198 shown in FIG. 13 are combined to form cutouts 71 and 72.

Alignment layers 11 and 21 may be coated on inner surfaces of the panels 100 and 200. The alignment layers 11 and 21 may be vertical alignment layers.

Figure 14:
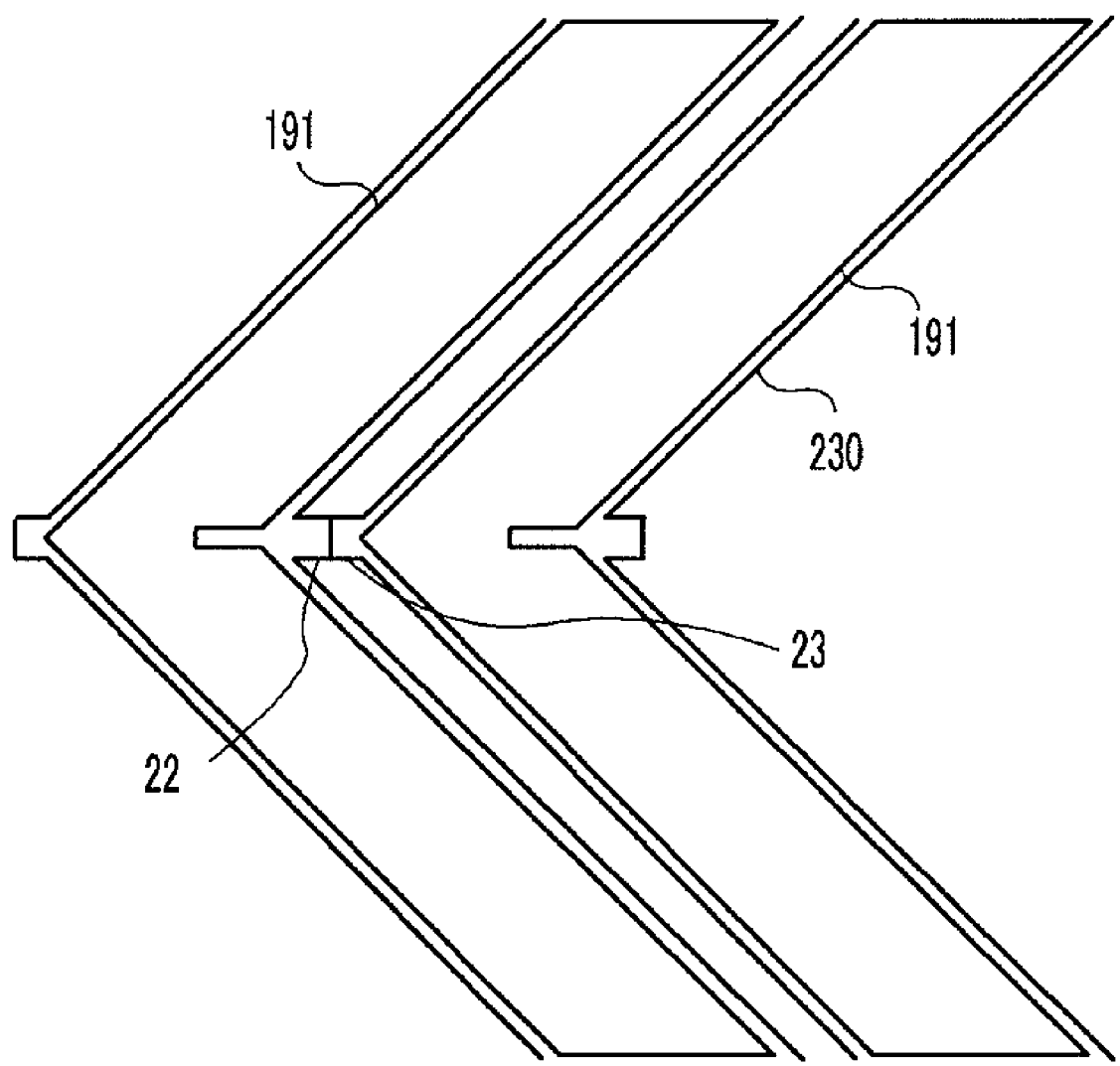
FIG. 14 is a schematic top plan view of a pixel electrode and a color filter according to an exemplary embodiment of the present invention.

FIG. 14 is a schematic top plan view of a pixel electrode and a color filter according to an exemplary embodiment of the present invention.

Referring to FIG. 14, each color filter 230 does not include connections and is not divided into first and second portions. Each color filter 230 includes a protrusion 23 overlapping a sharp end of a convex portion formed by curving a pixel electrode 191 and a protrusion 22 adjacent to a base of the concave portion formed by curving the pixel electrode 191. Since the protrusions 22 and 23 are formed between a convex portion of the pixel electrode 191 and a concave portion of an adjacent pixel electrode 191, height differences due to the color filters 230 are eliminated. Thus, the short circuiting of two adjacent pixel electrodes 191 can be prevented. When the protrusions 22 and 23 overlap in two pixel areas adjacent in a row direction, shapes of the protrusions 22 and 23 may be changed such that edges of the pixel electrode 191 are positioned outside the overlapping portion.

When forming the protrusions 22 and 23, all of edges of the pixel electrode 191 are disposed on the flat color filter 230. Thereby, the pixel electrode 191 is fully patterned to prevent the short circuiting between two adjacent pixel electrodes 191.

Accordingly, in exemplary embodiments of the present invention, connections are formed on portions where color filters are removed. Thereby, facing sides of two neighboring pixel electrodes and sides of a conductive pattern adjacent a pixel electrode are positioned on a flat surface. Thus, short circuiting of the two neighboring pixel electrodes and short circuiting of the pixel electrode and the conductive pattern can be prevented.

Although exemplary embodiments of the present invention have been described herein with reference to the accompanying drawings, it is to be understood that the present invention should not be limited to those precise embodiments and that various other changes and modifications may be made by one of ordinary skill in the related art without departing from the scope or spirit of the invention. All such changes and modifications are intended to be included within the scope of the invention as defined by the appended claims.

What is claimed is:

1. A thin film transistor array panel comprising:
    a substrate;
    a first gate line and a second gate line formed on the substrate;
    a storage electrode line between the first gate line and the second gate line;
    a data line intersecting the first gate line and the second gate line;
    a first thin film transistor connected to the first gate line and the data line;
    at least one color filter formed on the first thin film transistor, wherein the color filter comprises a first portion adjacent the first gate line with respect to the storage electrode line, a second portion adjacent the second gate line with respect to the storage electrode line, and a first connection connecting the first portion and the second portion and having a narrower width than that of the first and second portions;
    a first sub-pixel electrode formed on the color filter and connected to the first thin film transistor; and
    a second sub-pixel electrode facing the first sub-pixel electrode with respect to a gap,
    wherein at least one of an edge of the first sub-pixel electrode and an edge of the second sub-pixel electrode crosses over the first connection of the color filter, the edge of the first sub-pixel electrode, and the edge of the second sub-pixel electrode defining the gap between the first sub-pixel electrode and the second sub-pixel electrode.

2. The thin film transistor array panel of claim 1, wherein the edge of the first sub-pixel electrode and the edge of the second sub-pixel electrode cross over the first connection of the color filter.

3. The thin film transistor array panel of claim 2, wherein the entire edge of the first sub-pixel electrode and the entire edge of the second sub-pixel electrode cross over the first connection of the color filter.

4. The thin film transistor array panel of claim 1, further comprising a second connection connecting the first portion and the second portion of the color filter and having a narrower width than that of the first and second portions, and at least one of an edge of the first sub-pixel electrode and an edge of the second sub-pixel electrode adjacent the data line cross over the second connection of the color filter.

5. The thin film transistor array panel of claim 4, wherein all of the edges of the first sub-pixel electrode and the second sub-pixel electrode adjacent the data line cross over the first connection of the color filter.

6. The thin film transistor array panel of claim 4, wherein the second connection is formed at portions of a pixel area neighboring over the data line.

7. The thin film transistor array panel of claim 6, further comprising a shielding electrode formed on the color filter and formed along the data line, and two edges of the shielding electrode parallel to the data line cross over the second connection.

8. The thin film transistor array panel of claim 7, wherein the second connection comprises two edges parallel to the data line, and two edges of the shielding electrode parallel to the data line are positioned between two edges of the second connection.

9. The thin film transistor array panel of claim 4, wherein the second connection overlaps the storage electrode line.

10. The thin film transistor array panel of claim 1, further comprising a shielding electrode formed on the color filter and formed along the data line, wherein two color filters respectively formed on left and right portions with respect to the data line partly overlap, and two edges of the shielding electrode parallel to the data line are disposed outside the overlapping portions of the color filter.

11. The thin film transistor array panel of claim 10, further comprising a second connection connecting the first portion and the second portion of the color filter and having a narrower width than that of the first and second portions, wherein two edges of the shielding electrode parallel to the data line cross over the second connection of the color filter.

12. The thin film transistor array panel of claim 11, wherein the second connection comprises two edges parallel to the data line, and two edges of the shielding electrode parallel to the data line are positioned between two edges of the second connection.

13. The thin film transistor array panel of claim 11, wherein the second connection overlaps the storage electrode line.

14. The thin film transistor array panel of claim 1, further comprising a second thin film transistor connected to the second gate line, the data line, and the second pixel electrode.

15. The thin film transistor array panel of claim 1, wherein the first sub-pixel electrode and the second sub-pixel electrode are curved.

16. The thin film transistor array panel of claim 15, further comprising a second connection connecting the first portion and the second portion of the color filter and having a narrower width than that of the first and second portions, wherein at least one of an edge of the first sub-pixel electrode and an edge of the second sub-pixel electrode adjacent the data line cross over the second connection of the color filter, and the second connection is curved along an edge of the first sub-pixel electrode or the second sub-pixel electrode.

17. The thin film transistor array panel of claim 16, wherein the second connection overlaps the storage electrode line.

18. The thin film transistor array panel of claim 1, wherein the first connection overlaps the storage electrode line.

19. A thin film transistor array panel comprising:
a substrate;
a gate line formed on the substrate;
a storage electrode line parallel to the gate line;
a first data line and a second data line intersecting the gate line and storage electrode line;
a thin film transistor connected to the gate line and the first data line;
at least one color filter formed on the thin film transistor, wherein the color filter comprises a first portion and a second portion opposite with respect to the storage electrode line, and a first connection connecting the first portion and the second portion and having a narrower width than that of the first and second portions;
a pixel electrode formed on the color filter, connected to the thin film transistor, and disposed between the first data line and the second data line; and
a shielding electrode formed on the color filter and formed along the first data line, wherein two edges of the shielding electrode parallel to the first data line cross over the first connection,
wherein at least one of an edge of the pixel electrode adjacent the first data line and an edge of the pixel electrode adjacent the second data line crosses over the first connection of the color filter.

20. The thin film transistor array panel of claim 19, wherein the edge of the pixel electrode adjacent the first data line and the edge of the pixel electrode adjacent the second data line cross over the first connection of the color filter.

21. The thin film transistor array panel of claim 19, wherein the first connection overlaps the storage electrode line.

22. The thin film transistor array panel of claim 19, wherein two color filters respectively formed on both portions with respect to the first data line partly overlap, and two edges of the shielding electrode parallel to the first data line are disposed outside the overlapping portions of the color filter.

23. The thin film transistor array panel of claim 22, wherein the first connection comprises two edges parallel to the data line, and two edges of the shielding electrode parallel to the first data line are positioned between two edges of the first connection.

24. The thin film transistor array panel of claim 19, wherein the first connection comprises two edges parallel to the data line, and two edges of the shielding electrode parallel to the first data line are positioned between two edges of the first connection.

25. A thin film transistor array panel comprising:
a substrate;
a gate line formed on the substrate;
a storage electrode line formed on the substrate and parallel to the gate line;
a data line intersecting the gate line and storage electrode line;
a thin film transistor connected to the gate line and the first data line;
a color filter formed on the thin film transistor; and
a pixel electrode formed on the color filter and connected to the thin film transistor, wherein the pixel electrode having a convex portion and a concave portion is curved at at least one portion,
wherein the color filter is curved along the pixel electrode and comprises a protrusion overlapping an end of the convex portion of the pixel electrode.

26. The thin film transistor array panel of claim 25, wherein the color filter further comprises a protrusion adjacent a base of the concave portion of the pixel electrode.

27. The thin film transistor array panel of claim 26, wherein the protrusion adjacent the base of the concave portion of the pixel electrode is connected to a protrusion of the color filter overlapping a sharp end of a convex portion of a neighboring pixel electrode.

28. The thin film transistor array panel of claim 26, wherein the protrusion overlapping the sharp end and the protrusion adjacent the base overlap the storage electrode line.

* * * * *